United States Patent
Singh et al.

(10) Patent No.: US 9,251,501 B2
(45) Date of Patent: Feb. 2, 2016

(54) CROSS-PLATFORM REPORTING USER INTERFACE

(75) Inventors: Vikas Singh, Miyapur (IN); Wei Liu, Flower Mound, TX (US); Rahim Charania, Euless, TX (US); Ashutosh K. Sureka, Coppell, TX (US); Michael J. Naggar, Dallas, TX (US); Shuchi Patel, Frisco, TX (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 625 days.

(21) Appl. No.: 13/493,387

(22) Filed: Jun. 11, 2012

(65) Prior Publication Data

US 2013/0332825 A1    Dec. 12, 2013

(51) Int. Cl.
| | |
|---|---|
| G06F 17/00 | (2006.01) |
| H04H 60/31 | (2008.01) |
| G06Q 10/10 | (2012.01) |
| H04H 60/73 | (2008.01) |
| H04N 21/24 | (2011.01) |
| H04N 21/442 | (2011.01) |
| H04H 60/40 | (2008.01) |
| H04H 60/72 | (2008.01) |

(52) U.S. Cl.
CPC .............. *G06Q 10/10* (2013.01); *H04H 60/31* (2013.01); *H04H 60/40* (2013.01); *H04H 60/72* (2013.01); *H04H 60/73* (2013.01); *H04N 21/2407* (2013.01); *H04N 21/44222* (2013.01)

(58) Field of Classification Search
CPC ..................... H04N 21/44204; H04N 21/4532
USPC ........................................ 715/273; 725/53, 93
See application file for complete search history.

(56) References Cited

U.S. PATENT DOCUMENTS

| | | | | |
|---|---|---|---|---|
| 2003/0051246 | A1* | 3/2003 | Wilder | H04N 5/44543 725/49 |
| 2004/0158852 | A1* | 8/2004 | Wysocki | H04N 5/76 725/32 |
| 2006/0294548 | A1* | 12/2006 | Potrebic | G06F 17/30265 725/46 |
| 2007/0050262 | A1* | 3/2007 | Van Breemen | G06Q 30/02 705/14.48 |
| 2007/0053291 | A1* | 3/2007 | Hiltunen | H04H 60/27 370/233 |
| 2008/0005766 | A1* | 1/2008 | Ostrowska | H04N 5/44543 725/53 |
| 2008/0082927 | A1* | 4/2008 | Kelts | G06F 3/0481 715/762 |
| 2009/0100459 | A1* | 4/2009 | Riedl | H04N 21/2385 725/35 |
| 2009/0249403 | A1* | 10/2009 | Keum | H04H 20/26 725/53 |
| 2011/0047569 | A1* | 2/2011 | Mears | H04N 5/4401 725/39 |
| 2011/0137776 | A1* | 6/2011 | Goad | G06Q 20/102 705/34 |

(Continued)

OTHER PUBLICATIONS

Samsung's 2012 Smart TV Platform: Explained, May 18, 2012, pp. 1-13 http://televisions.reviewed.com/news/samsung-s-2012-smart-tv-platform-explained.*

*Primary Examiner* — Scott Baderman
*Assistant Examiner* — Mario M Velez-Lopez (57) ABSTRACT

A user device presents, to a user, media content provided from multiple providers and logs the presented media content from the multiple providers. The user device indicates, based on the multiple providers, proportions of the presented media content from the multiple providers during a particular reporting period and determines whether particular presented media content, of the presented media content from the particular reporting period, was available for presentation from another of the multiple providers. The user device generates a report, for the user, that indicates if the presented media content could have been consolidated among fewer of the multiple providers.

20 Claims, 9 Drawing Sheets

(56) References Cited

U.S. PATENT DOCUMENTS

| | | | |
|---|---|---|---|
| 2011/0173653 A1* | 7/2011 | Arsenault | H04N 7/17336 725/31 |
| 2011/0197213 A1* | 8/2011 | Shim | H04H 60/33 725/9 |
| 2011/0209185 A1* | 8/2011 | Cho | H04N 7/17318 725/93 |
| 2011/0214147 A1* | 9/2011 | Kashyap | G11B 27/105 725/46 |
| 2011/0311206 A1* | 12/2011 | Hubner | H04N 5/765 386/297 |
| 2012/0272185 A1* | 10/2012 | Dodson | H04N 21/4828 715/810 |
| 2013/0160066 A1* | 6/2013 | Newell | H04N 21/4181 725/116 |
| 2013/0254308 A1* | 9/2013 | Rose | H04N 7/17318 709/206 |
| 2014/0095341 A1* | 4/2014 | Woods | G06Q 30/06 705/26.5 |

* cited by examiner

CROSS-PLATFORM REPORTING USER INTERFACE

BACKGROUND

Modern telecommunications systems offer subscribers a number of different communications services, such as television service, data service, and telephone services. Subscribers to such services have access to an ever-growing amount and variety of content, services, and equipment, such as broadcast television content, non-broadcast television content (often referred to as "cable" television content), on demand and pay-per-view content, wireless services, widgets, applications, etc. Subscribers may purchase or subscribe to available content or services by communicating with their providers.

DETAILED DESCRIPTION OF PREFERRED EMBODIMENTS

The following detailed description refers to the accompanying drawings. The same reference numbers in different drawings may identify the same or similar elements.

As described herein, systems and/or methods provided herein may present, to a user, media content provided from multiple providers and logs the presented media content from the multiple providers. The systems and/or methods may indicate, based on the multiple providers, proportions of the presented media content from the multiple providers during a particular reporting period and may determine whether particular presented media content, of the presented media content from the particular reporting period, was available for presentation from another of the multiple providers. The systems and/or methods may generate a report, for the user, that indicates if the presented media content could have been consolidated among fewer of the multiple providers.

Figure 1:
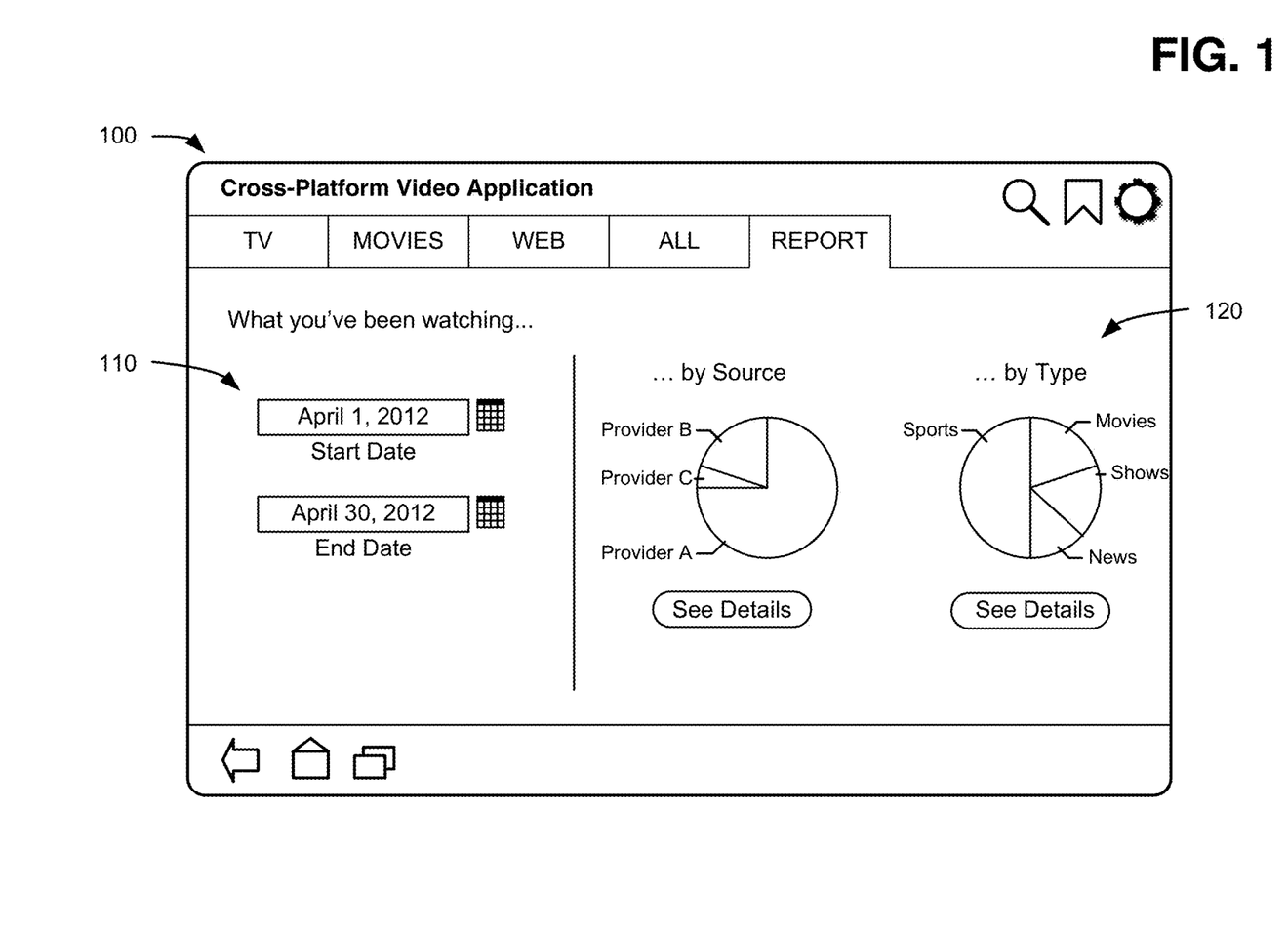
FIG. 1 is a diagram illustrating an exemplary implementation of a user interface, as described herein.

FIG. 1 is a diagram illustrating an exemplary implementation of the concepts described herein. An application, executed on a user device, may provide a platform to conveniently select and present multimedia content from multiple sources. For example, the application may provide a platform for content delivered over an IP network from service providers (e.g., "cable" television services with cross-platform content delivery), streaming content services, content downloading services, and ad-hoc media services. As shown in FIG. 1, a user interface 100 may provide options to select from different content groupings (e.g., "TV," "Movies," "Web," or "All") across multiple providers. Some or all of the multiple content providers may require separate accounts/subscriptions to access their respective content. Thus, a user may browse through content offerings associated with multiple user accounts/subscriptions in a single interface. Because a user may select content options from among multiple different content providers, it may be desirable for a user to track his/her selections among the multiple providers. Additionally, it may also be desirable for content providers to know what content their subscribers are selecting (e.g., in the context of other available choices).

As shown in FIG. 1, a user interface 100 may provide a reporting interface with an input area 110 to permit a user to identify a time period (e.g., a month, week, or another period) of use. The reporting interface may provide, in a report area 120, one or more representations of content sources used by the user over the selected time period. For example, report area 120 may include an indication of a percentage of use among multiple providers (e.g., content providers with whom a subscriber has an account, such as a subscription television platform, various streaming video platforms, etc.). Additionally, or alternatively, report area 120 may include an indication of a percentage of each type (e.g., sports, movies, shows, news, etc.) of content consumed. Users may use information presented in information interface 100 to, for example, evaluate the personal value derived from one subscription relative to another.

Figure 2:
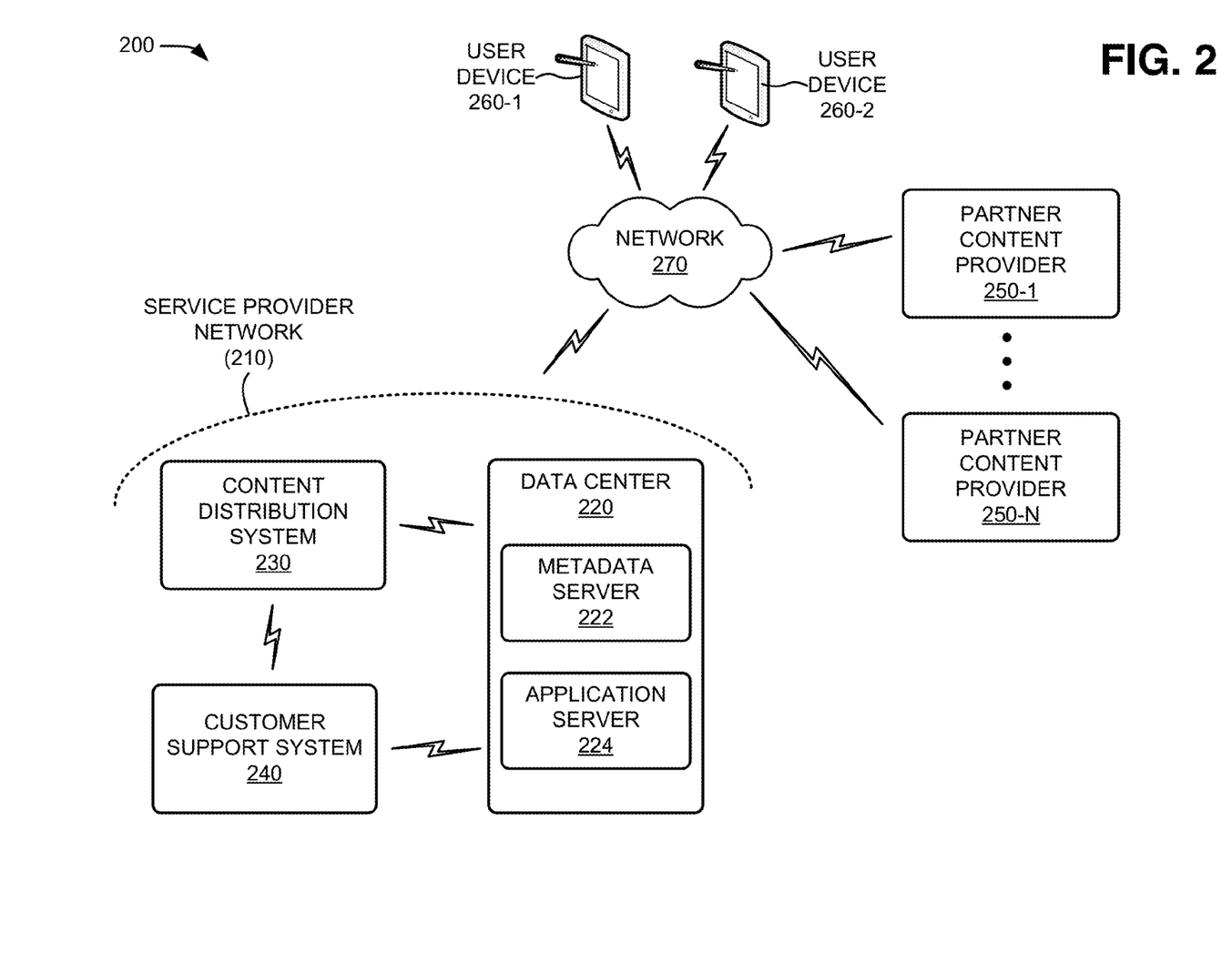
FIG. 2 is a diagram illustrating an exemplary network in which systems and/or methods described herein may be implemented.

FIG. 2 is an exemplary network 200 in which systems and/or methods described herein may be implemented. As illustrated, network 200 may include service provider network 210 that includes a data center 220, a content distribution system 230, and a customer support system 240; partner content providers 250-1 through 250-N (collectively "partner content providers 250" and individually "partner content provider 250"); and user devices 260-1 and 260-2 (collectively "user devices 260" and individually "user device 260"), interconnected by a network 270.

Service provider network 210 may include network devices to provide a cross-platform application and/or content delivery services to subscribers. Service provider network 210 may also manage data collection for content available from partner content providers 250. Service provider network 210 may include, for example, one or more private IP networks that use a private IP address space. Service provider network 210 may include a local area network (LAN), an intranet, a private wide area network (WAN), etc. In one implementation, service provider network 210 may implement one or more Virtual Private Networks (VPNs) for providing communication between, for example, any of data center 220, content distribution system 230, and customer support system 240. Service provider network 210 may be protected/separated from other networks, such as network 270, by a firewall. Although shown as a single element in FIG. 2, service provider network 210 may include a number of separate networks.

Data center 220 may manage user authentication, authorization for playing content, selection of content, and/or purchase of content by a user of user devices 260. As shown in FIG. 2, data center 220 may include, for example, a metadata server 222 and an application server 224. In one implementation, data center 220 may be accessed by user devices 260 via network 270.

Metadata server 222 may provide a unified catalog of digital content for users (e.g., of user devices 260) to consume (e.g., view, buy, rent, or subscribe). In one implementation, metadata server 222 may collect and/or present listings of content available to particular user devices 260. For example, metadata server 222 may receive content metadata, such as lists or categories of content, from content distribution system 230 and/or partner content providers 250. Metadata server 222 may use the content metadata to provide currently-available content options to cross-platform applications running on user devices 260 (e.g., based on active subscriptions/accounts associated with user devices 260). Metadata server 222 may provide the content metadata to user device 260 directly or may communicate with user device 260 via application server 224.

Application server 224 may provide a backend support system for cross-platform applications residing on user devices 260. For example, application server 224 may permit user device 260 to download a cross-platform application that enables a user to find content of interest or play downloaded or streaming content from any of multiple content providers (e.g., content distribution system 230 and partner content providers 250). In some implementations, the downloaded cross-platform application may participate in registration of user device 260 with the multiple content providers.

Once user device 260 is registered with a content provider, the downloaded cross-platform application may enable user device 260 to present, to a user of user device 260, information received from data center 220 in an interactive format, to allow selection of particular digital content. Furthermore, the cross-platform application may coordinate with content distribution system 230 and partner content providers 250 in authorizing user device 260 to access the selected content. Application server 224 may also provide content metadata, such as lists or categories of content, to user device 260. In one implementation, the interactions between application server 224 and user device 260 may be performed using hypertext transfer protocol (HTTP) or secure HTTP (HTTPS) via network 270.

Content distribution system 230 may aggregate content and metadata, process content, and distribute content. For example, content distribution system 230 may receive, capture, and encrypt video streams of online live TV programs and tag captured content with an identifier, channel identifier, program identifier, airing time, etc. In another example, content distribution system 230 may transcode content into a digital format suitable for consumption on particular user devices 260. In some implementations, content distribution system 230 may include a transcoder (hardware or software) to convert a video file from one format to another (e.g., from one bit rate to another bit rate, from one resolution to another, from one standard to another, from one file size to another, etc.).

In one implementation, content distribution system 230 may include a content delivery system and/or a digital rights management (DRM) server. The content delivery system may deliver digital content from a backend server to user devices 260 via, for example, a content delivery network (CDN). For example, content delivery system 212 may include a server that provides streaming data (e.g., via a streaming universal resource locator (URL)) to user devices 260 (e.g., via public network 270). The DRM server may issue, validate, and/or enforce DRM licenses to a client, such as a cross-platform application running on one of user devices 260.

Customer support system 240 may provide an interface to receive subscriber usage information and to provide streamlined usage information to partners, such as partner content providers 250. In one implementation, customer support system 240 may include interfaces for accessing data center 220, for example, to receive usage reports from subscribers. Customer support system 240 may, for example, consolidate usage reports from multiple subscribers (extracting personal information if necessary) to provide usage overview information to partner content providers 250.

Partner content provider 250 may aggregate content and metadata, process content, and distribute content. Content may be the same or different content than available from content distribution system 230 or another partner content provider 250. Examples of partner content provider 250 may include, for example, subscriptions services for over-the-top (OTT) video and/or other streaming media services. OTT video content may include, for example, live content streams, pre-recorded video content (e.g., television episodes), and content associated with video portals provided by content providers, such as Hulu™, Netflix™, YouTube™, Amazon™ Instant Video, CNN, etc.

Each of partner content providers 250 may coordinate with components of service provider network 210 to provide authentication procedures and content metadata for its respective content. In one implementation, partner content provider 250 may provide content metadata to service provider network 210 (e.g., metadata server 222) so that user devices 260 executing a cross-platform application (e.g., provided by service provider network 210) may select content available from partner content provider 250. Based on the metadata, user devices 260 may access selected content and retrieve the selected content from partner content provider 250.

User device 260 may include a computational or communication device. User device 260 may enable a user to view video content or interact with another user device 260 or a video display device (e.g., a set-top box and/or television). User device 260 may include, for example, a personal communications system (PCS) terminal (e.g., a smartphone that may combine a cellular radiotelephone with data processing and data communications capabilities), a tablet computer, a smartphone, a personal computer, a laptop computer, a gaming console, an Internet television, or other types of computation or communication devices.

User device 260 may include a cross-platform application that enables user device 260 to communicate with, for example, service provider network 210 and/or partner content providers 250. The cross-platform application may provide a single interface to select and view content from multiple content sources. For example, the cross-platform application may permit a user of user device 260 to login to an account (e.g., via application server 224) and access catalog information (e.g., from metadata server 222) for content from multiple providers. The cross-platform application may allow a user to select particular content, access another provider account (if necessary), and/or consume live streaming video content (e.g., from content distribution system 230 or partner content providers 250). As described further herein, the cross-platform application may also log content selections and report usage among the multiple providers.

Network 270 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element in FIG. 2, network 270 may include a number of separate networks that function to provide services to user devices 260.

In FIG. 2, the particular arrangement and number of components of network 200 are illustrated for simplicity. In practice there may be more service provider networks 210, data centers 220, content distribution systems 230, customer support systems 240, partner content providers 250, user devices 260, and/or networks 270. Components of system 200 may be connected via wired and/or wireless links.

Figure 3:
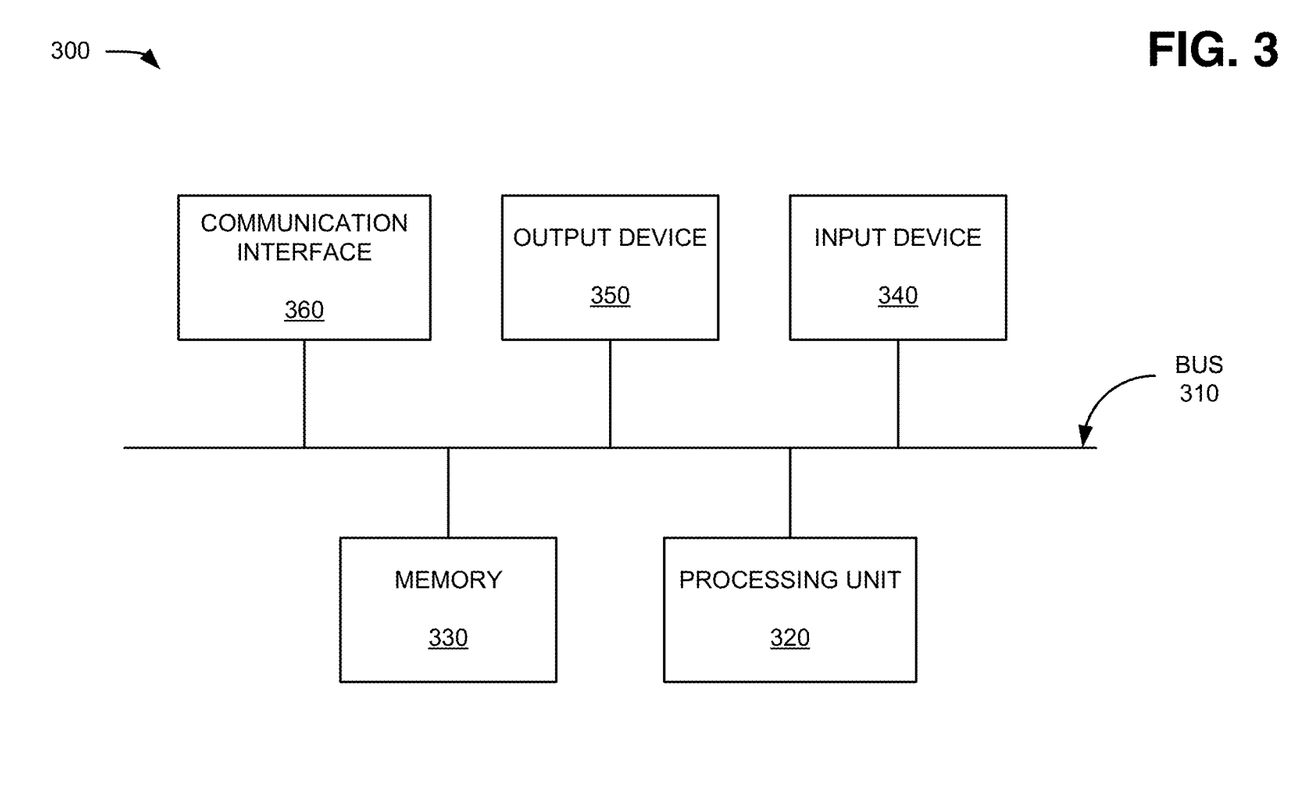
FIG. 3 is a block diagram of exemplary components of a device that may correspond to one of the devices of FIG. 2.

FIG. 3 is a diagram of exemplary components of a device 300. Each of data center 220, content distribution system 230, customer support system 240, partner content provider 250, and user device 260 may be implemented/installed as software, or a combination of hardware and software, on one or more of device 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
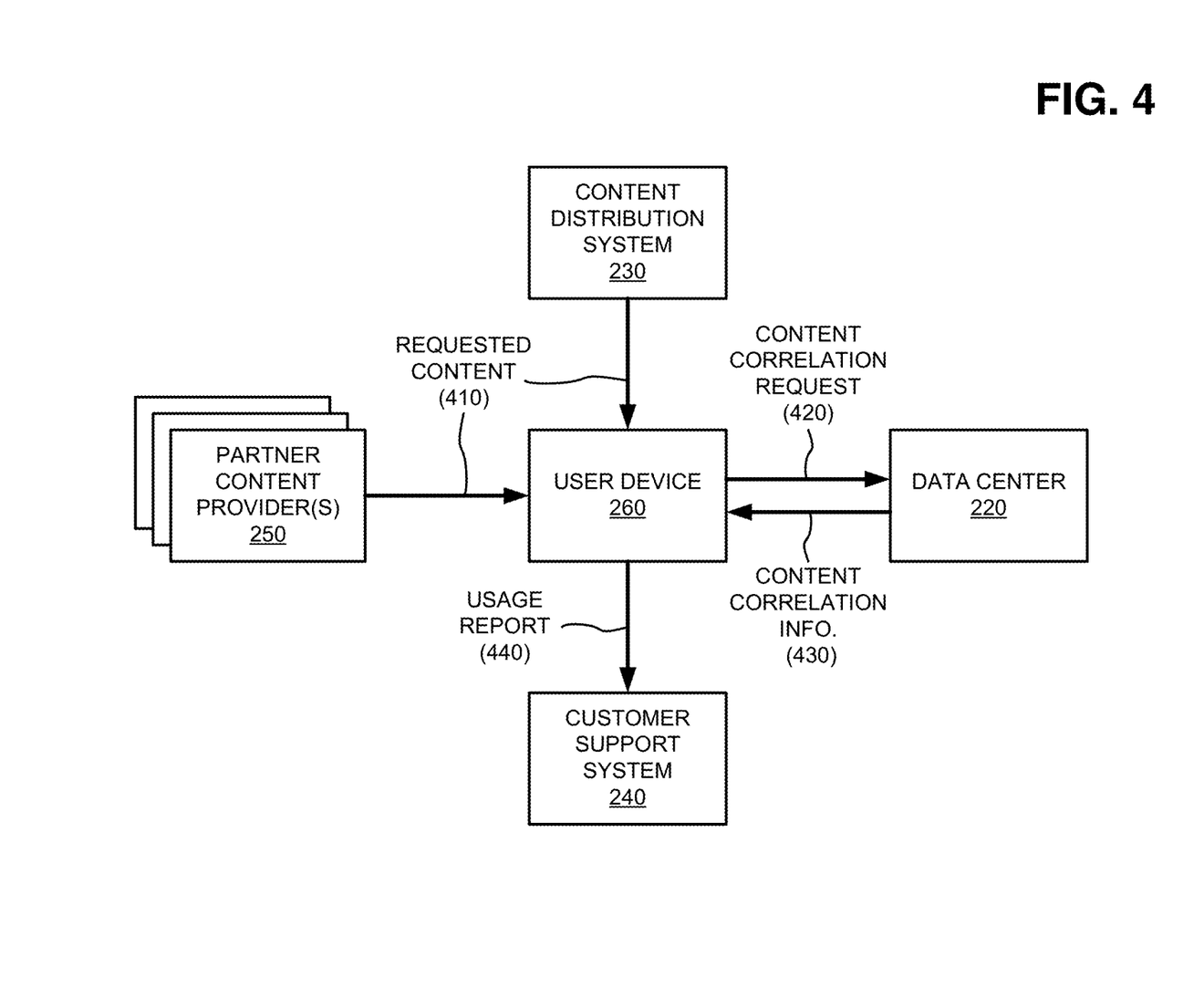
FIG. 4 is a diagram of exemplary communications between devices in the network of FIG. 2.

FIG. 4 is a diagram of exemplary communications for a portion 400 of network 200. Communications in FIG. 4 may represent communications to support a reporting of different content provider usage in a cross-platform application. As shown in FIG. 4, network portion 400 may include data center 220, content distribution system 230, customer support system 240, partner content provider(s) 250, and user device 260. Data center 220, content distribution system 230, customer support system 240, partner content provider(s) 250, and user device 260 may include features described above in connection with, for example, FIGS. 1-3.

As shown in FIG. 4, user device 260 may receive requested content 410 from content distribution system 230 and/or partner content providers 250. Requested content 410 may be provided, for example, for presentation to a user in response to content selections provided from the user of a cross-platform application being executed on user device 260. Requested content 410 may include, for example, content provided over a period of time (e.g., days, weeks, months, etc.). User device 260 may create a content usage log based on requested content 410. The content usage log may include, for each item of requested content 410, metadata such as a content identifier (e.g., a title, universal ID number, etc.), a viewing time (e.g., a start and stop time), a content source (e.g., content distribution system 230 or a partner content provider 250), a type of content (e.g., sports, movies, news, etc.), etc.

User device 260 may use the content usage log to generate a report, for a user, that indicates a breakdown of use among multiple sources. The report may be generated, for example, in response to a particular user request or as part of a scheduled report cycle. To prepare the report (e.g., in response to a request from a user), user device 260 may provide a content correlation request 420 to data center 220. Content correlation request 420 may include, for example, content identifiers for some or all of the content included in the content usage log. Content correlation request 420 may generally include sufficient information to enable data center 220 to detect potential overlap in available sources. In one implementation, content correlation request 420 may include a minimal number of content identifiers to reduce correlation processing. For example, if a majority of content in the content usage log is associated with a particular source, content correlation request 420 may include content identifiers only from sources other than the majority source. In another implementation, content correlation request 420 may include a list of all content identifiers in the content usage log. In another implementation, an iterative exchange between user device 260 and data center 220 may be used to determine overlapping content in available sources.

Data center 220 may cross-reference content identifiers in content correlation request 420 to determine if any items are/were available from other sources (e.g., another one of content distribution system 230 and/or partner content providers 250). In one implementation, data center 220 may compare each title in content correlation request 420 with listed offerings from each other service provider for which user device 260 has an active account/subscription. For example, assume user device 260 is associated with accounts for four service providers, data center 220 may cross-reference items in content correlation request 420 with catalog listings from each of the four accounts. Matches between items in content correlation request 420 and data center 220 may be provided to user device 260 as content correlation information 430.

In another implementation, content correlation information 430 may include raw data (or a subset of raw data) and user device 260 may process the raw data to determine if there is overlapping content in available sources. In still another implementation, user device 260 may receive generic content correlation information 430 (e.g., from data center 220) that is independent of a particular content correlation request 420. For example, data center 220 may provide (e.g., at periodic intervals or upon request from user device 260) a content listing of content available from particular content distribution system 230/partner content providers 250 with whom a user of user device 260 has an active subscription. Correlation determinations may then be performed locally on user device 260.

User device 260 may apply requested content 410 and content correlation information 430 to generate a report to a user of user device. Reports are described further below in connection with, for example, FIGS. 5-6C.

User device 260 may also apply requested content 410 and content correlation information 430 to provide a usage report 440 to customer support system 240. Usage report 440 may include, for example, the same or similar data that is presented to the user. However, usage report 440 may be provided in a manner that does not associate usage report 440 with a particular user/account. Customer support system 240 may, for example, consolidate usage reports 440 from multiple users to provide usage overview information to content providers.

Although FIG. 4 shows exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5:
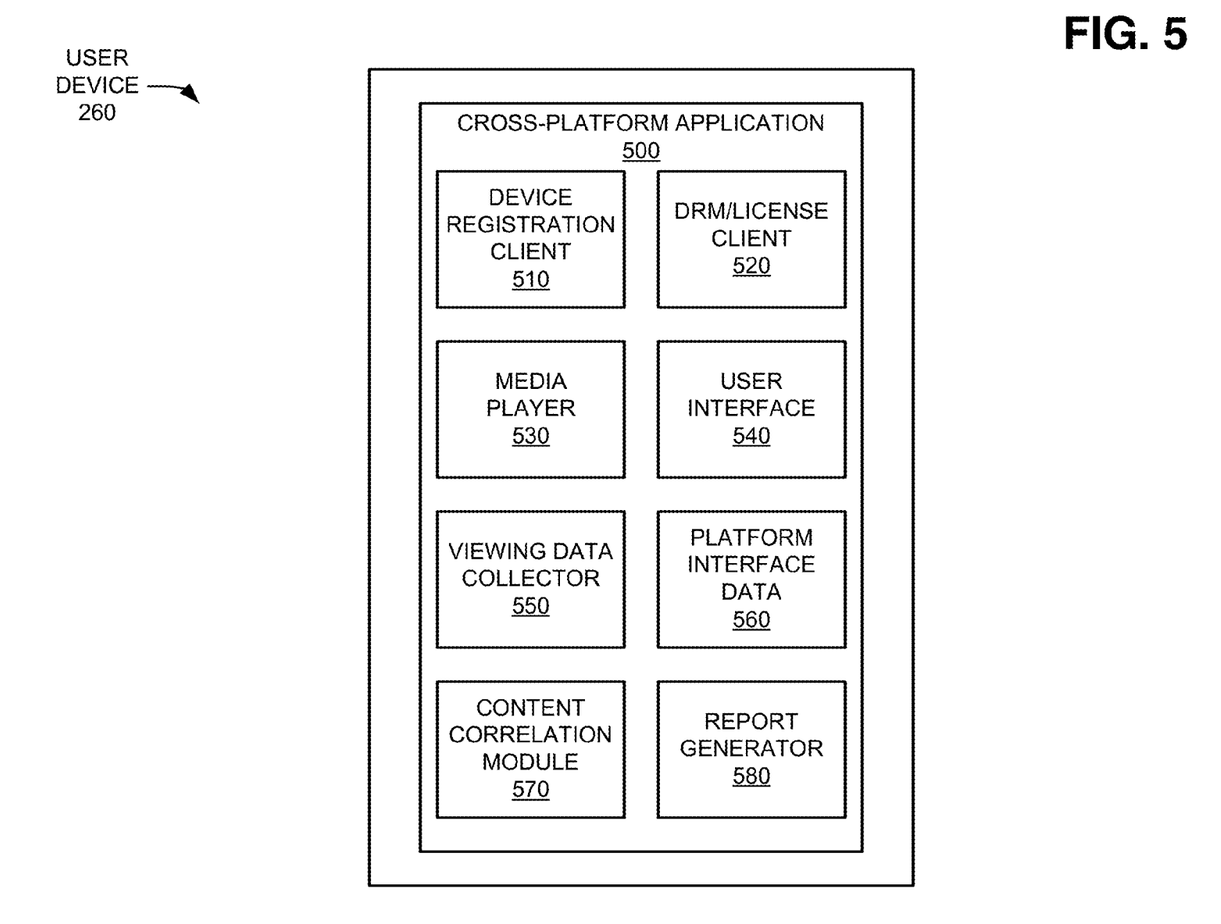
FIG. 5 is a block diagram of exemplary functional components of the user device of FIG. 2.

FIG. 5 is a block diagram of exemplary functional components of user device 260. The functions described in connection with FIG. 5 may be performed by one or more components of FIG. 3. As shown in FIG. 5, user device 260 may include a cross-platform application 500 including a device registration client 510, a DRM/license client 520, a media player 530, a user interface 540, viewing data collector 550, platform interface data 560, a content correlation module 570, and a report generator 580.

Cross-platform application 500 may include hardware and software components. The software components may be downloaded, for example, from application server 224 in data center 220 when user device 260 contacts application server 224 to enable user device 260 to play content from/via service provider network 210.

Cross-platform application 500 may coordinate with service provider network 210 and partner content providers 250 to provide a single interface for viewing content from multiple providers. In addition, cross-platform application 500 may enable user device 260 to perform functions that are described above, such as: playing video content or interact with another user device 260 or a video display device (e.g., a set-top box and/or television); communicating with, for example, data center 220 and/or presenting information received from data center 220 to a user; permitting a user of user device 260 to login to an account with service provider network 210 (e.g., via application server 224); permitting a user of user device 260 to login to an account with partner content providers 250; accessing catalog information (e.g., from metadata server 222); submitting an order; and/or consuming live streaming video content (e.g., from content distribution system 230 or partner content providers 250).

Depending on the implementation, cross-platform application 500 may include additional, fewer, different, or differently arranged components than those illustrated in FIG. 5. For example, in one implementation, cross-platform application 500 may not include media player 530. In such implementations, media player 530 may be or may have been installed on user device 260 as a separate application. For example, media player 530 may be a stand-alone application or installed as part of another application (such as an application associated with one or more of partner content providers 250) to present content to a user.

Device registration client 510 may participate in registration of user device 260. For example, device registration client 510 may initiate a registration with one or more of content distribution system 230 and partner content provider 250. For example, to start a registration with content distribution system 230, device registration client 510 may send a message to service provider network 210 to determine whether user device 260 is registered (e.g., recognized by service provider network 210 as a device that can receive content from service provider network 210). The message may include an identifier, also known as a client ID, which is associated and distributed with cross-platform application 500. Upon receipt of the message, service provider network 210 may indicate to device registration client 510 whether user device 260 has been registered at service provider network 210. If user device 260 has not been registered at service provider network 210, service provider network 210 may send an activation code and an activation URL to device registration client 510. In response, the user of user device 260 may manually register user device 260 with service provider network 210 for use of content distribution system 230.

The registration may entail the user bringing up a browser at user device 260, visiting the activation URL provided by service provider network 210, authenticating the user/user device 260 at the activation URL, and upon successful authentication, inputting the activation code provided by service provider network 210. Upon successful registration, application server 224 may return a globally unique registration token to user device 260 when it contacts application server 224. User device 260 may store the registration token, the activation code, and/or the client ID as platform interface data 560.

Using application program interfaces (APIs) for partner content providers 250, device registration client 510 may performs similar registration procedures with particular partner content providers 250 (e.g., selected by a user of user device 260). Partner content providers 250 may provide the APIs for inclusion in cross-platform application 500. Data center 220 (e.g., application server 224) may provide a different API to user device 260 depending, for example, on the type of operating system included on user device 260. For example, an application server API may include a web (e.g., web 2.0) API, an Android® API, an iOS API, or a Windows CE API. User device 260 may also store the registration information for partner content providers 250 as platform interface data 560.

DMR/license client 520 acquires licenses for content that is selected by a user for viewing or playing at user device 260. When a user selects particular content via user interface 540, cross-platform application 500 begins to download either metadata or the video from content distribution system 230 or partner content provider 250. Furthermore, DMR/license client 520 may send a request for a license to content distribution system 230 or partner content providers 250. The request may include all or a portion of platform interface data 560 (e.g., a registration token).

If DMR/license client 520 receives a license for the selected content from content distribution system 230/partner content providers 250, DRM/license client 520 stores the license. The license may include a decryption key, for example, to decrypt the particular content. The particular content may have been encrypted for copyright protection.

Media player 530 may decode and play content that is received via content distribution system 230 and/or partner content providers 250. Media player 530 may output the decoded video to output components (e.g., a display, speakers, etc.) of user device 260.

User interface 540 may enable a user to request a list of available content and select from the list of available content. User interface 540 may also include an account login interface. For example, user interface 540 may request, from data center 220, a list of content available for downloading (e.g., from any of content distribution system 230 and partner content providers 250 for which the user of device 260 has registered) and may present the list of content to a user of user device 260. User interface 540 may include an interactive client interface that allows a user to provide input, such as user passwords, preferences, and selections from the list of available content. In one implementation, user interface 540 may indicate a user's selection (e.g., from the catalog) to data center 220 and, in return, receive session-specific information to obtain the selected content. In implementations described herein, user interface 540 may also include a reporting interface to solicit configuration information and to present usage reports. For example, user interface 540 may solicit reporting periods for usage reports and present interactive usage reports to a user.

Viewing data collector 550 logs selection and consumption of content by a user of user device 260. For example, viewing data collector 550 may track content selections provided to user interface 540. In one implementation, viewing data collector 550 may track a content identifier (e.g., a unique ID or title) and a content source (e.g., one of content distribution system 230 or partner content providers 250) of a user selection. Additionally, or alternatively, viewing data collector 550 may record a start time, an end time, and/or a duration for each content selection. In another implementation, viewing data collector 550 may track additional information that may be indicative of user interest in selected content, such as a bookmark or social media tag (e.g., a "like" or "fan of" indication).

Platform interface data 560 may include, for example, APIs, URLs, login information (e.g., a user identifier and a password), and other information to enable cross-platform application 500 to access content from content distribution system 230 and/or partner content providers 250. In one implementation, platform interface data 560 may also include session-specific information, such as, for example, cookies, URLs, or other information to enable user device 260 to access content servers or digital rights management (DRM) servers associated with content distribution system 230 and/or partner content providers 250.

Content correlation module 570 determines whether content viewed during a particular reporting period could be consumed in a more efficient manner. For example, content correlation module 570 may detect if all content from a particular provider could have been received from other providers (e.g., with whom a user already has an active account), providing an opportunity for a user to consider eliminating unnecessary accounts. Content correlation module 570 may generate requests to cross-reference content identifiers (e.g., corresponding to selected content consumed during a particular period) to determine if any selected items are/were available from other sources to which a user has access (e.g., another one of content distribution system 230 and/or partner content providers 250).

In one implementation, content correlation module 570 may apply logic to minimize the number of items required to be cross-referenced. For example, content correlation module 570 may limit correlation inquiries to items where the provider provided less than a particular percentage (e.g., 25%, 10%, etc.) of the total content for a selected reporting period. Percentages of total content in a reporting period may be determined, for example, based on a total number of items in the reporting period, actual viewing times, or durations included in content metadata. In one implementation, content correlation module 570 may provide correlation requests to data center 220 (or another remote server) to calculate correlations using information in metadata server 222. In another implementation, content correlation module 570 may request (e.g., from metadata server 222) metadata corresponding to a particular set of content and locally calculate correlations.

Report generator 580 may apply information from viewing data collector 550 and results from content correlation module 570 to generate a usage report. The usage report may be presented, for example, via user interface 540. The usage report may include a graphical representation, tables, and or other information formats. In one implementation, report generator 580 may generate reports based on data related to content actually viewed by a user. In another implementation, report generator 580 may generate reports based on viewed content and other indicators, such as bookmarks or social media tag associated with particular content.

Although FIG. 5 shows exemplary functional components of user device 260, in other implementations, user device 260 may include fewer, different, and/or additional functional components than depicted in FIG. 5. Alternatively, or additionally, one or more functional components of user device 260 may perform one or more other tasks described as being performed by one or more other functional components of user device 260.

Figure 6A:
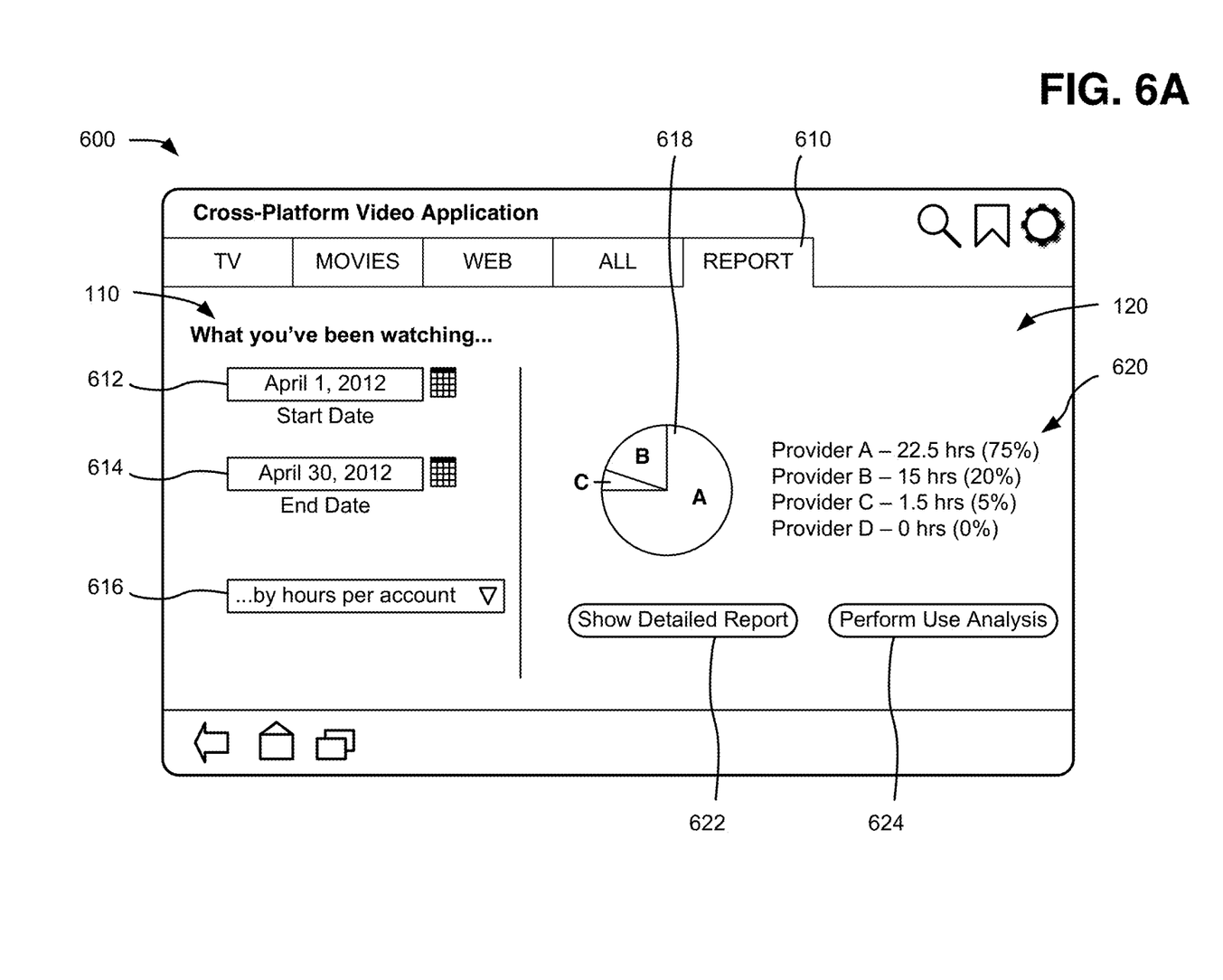
FIGS. 6A-6C are diagrams of exemplary user interfaces that may be presented by the user device of FIG. 2.
Figure 6B:
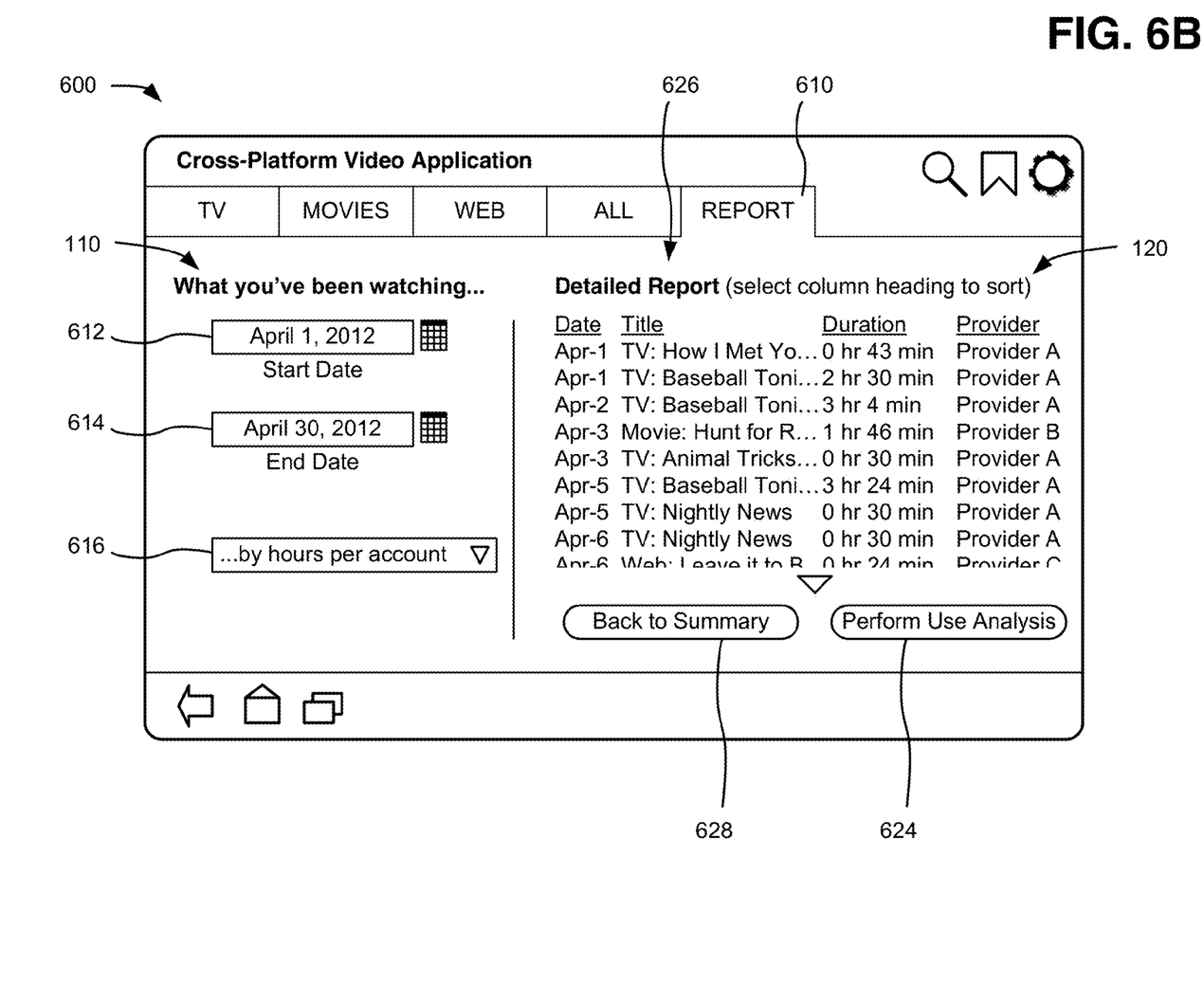
Figure 6C:
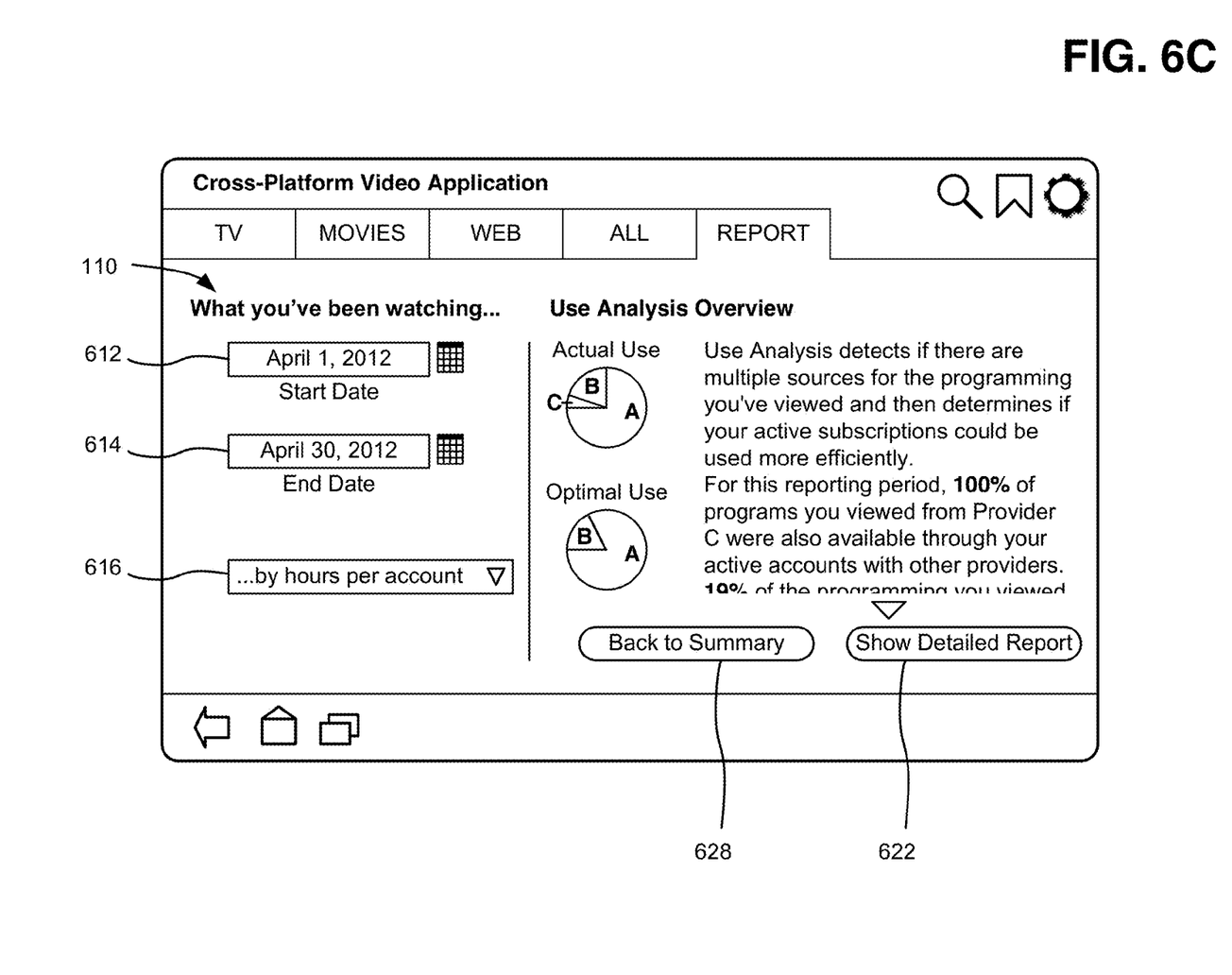

FIGS. 6A-6C are diagrams of exemplary user interfaces that may be presented by cross-platform application 500 being executed on user device 260. FIGS. 6A-6C and other depictions herein include exemplary user interfaces which may be suitable for a particular type of user device 260, such as a tablet computer. However, in other implementations, user interfaces may include different information and/or arrangements that may be more suitable for different user devices. For example, in other implementations, a user interface may be provided for a smartphone, personal computer, internet television, or another type of user device 260.

As shown in FIG. 6A, a user interface 600 may include multiple windows or tabs to select, present, and/or report content. For example, a report tab 610 may provide an interface to view usage reports. Report tab 610 may include input area 110 and report area 120.

Input area 110 may generally include an area to solicit, from a user, report criteria for a usage report. As shown in FIG. 6A, input area 110 may include an area to receive user input to identify a time period for a report. For example, input area 110 may include a start date input field 612 and an end date input field 614. In other implementation, input area 110 may include other input options, such as automatic reporting periods (e.g., monthly, weekly, etc.) or textual period definitions (e.g., "year to date"). Input area 110 may also include other input criteria, such as percentage criteria field 616. Percentage criteria field 616 may include an indication of how viewed content is weighted in a usage report. Percentage criteria field 616 may include, for example, options to present usage based on a total number of items in the reporting period, actual viewing times, or content duration (e.g., as indicated in content metadata).

Reporting area 120 may generally include an area to present usage reports based on report criteria provided in input area 110. As shown in FIG. 6A, reporting area 120 may include a graphical overview 618 of a user's content consumption (e.g., for the reporting period defined in input area 110). Graphical overview 618 may include graph (e.g., a pie chart, bar graph, etc.) or other graphic representation that visually depicts how a user's content consumption is distributed among multiple providers (e.g., content distribution system 230 and partner content providers 250 for which a user has an account). Reporting area 120 may also include a textual summary 620 that describes data shown in graphical overview 618.

Reporting area 120 may also include a selections button 622 and 624. Selection button 622 may provide a link to show a detailed report of information summarized in graphical overview 618 and/or textual summary 620. Selection, by a user, of selection button 622 may cause cross-platform application 500 to modify user interface as shown in FIG. 6B. Selection button 624 may provide a link to initiate/show a correlation of whether content viewed during a particular reporting period could be consumed in a more efficient manner. Selection, by a user, of selection button 624 may cause cross-platform application 500 to modify user interface as shown in FIG. 6C.

Referring to FIG. 6B, selection of selection button 622 may cause user interface 600 to present a detailed report 626 in reporting area 120. Detailed report 626 may include a data listing of the data used to formulate graphical overview 618 and/or textual summary 620. Detailed report 626 may include, for example, a list of individual content titles, providers, dates viewed, durations, etc. In one implementation, detailed report 626 may include sortable columns/categories to allow a user to view different groupings. As shown in FIG. 6B, reporting area 120 may also include selection button 624 and a selection button 628 to navigate back to the graphical summary of FIG. 6A.

Referring to FIG. 6C, selection of selection button 624 may cause user interface 600 to present a correlation report 630 in reporting area 120. Correlation report 630 may include data (e.g., data collected by content correlation module 570) to present whether all content from a particular provider could have been received from other providers (e.g., with whom a user already has an active account). In one implementation, correlation report 630 may include both a graphical representation and a textual explanation of the correlation data. In other implementations, correlation report 630 may be divided into multiple screens. As shown in FIG. 6C, reporting area 120 may also include selection button 622 to navigate back to the detailed report of FIG. 6B and a selection button 628 to navigate back to the graphical summary of FIG. 6A.

Although FIGS. 6A-6C show exemplary user interfaces of cross-platform application 500, in other implementations, cross-platform application 500 may include additional, different, and/or differently-arranged information than depicted in FIGS. 6A-6C.

Figure 7:
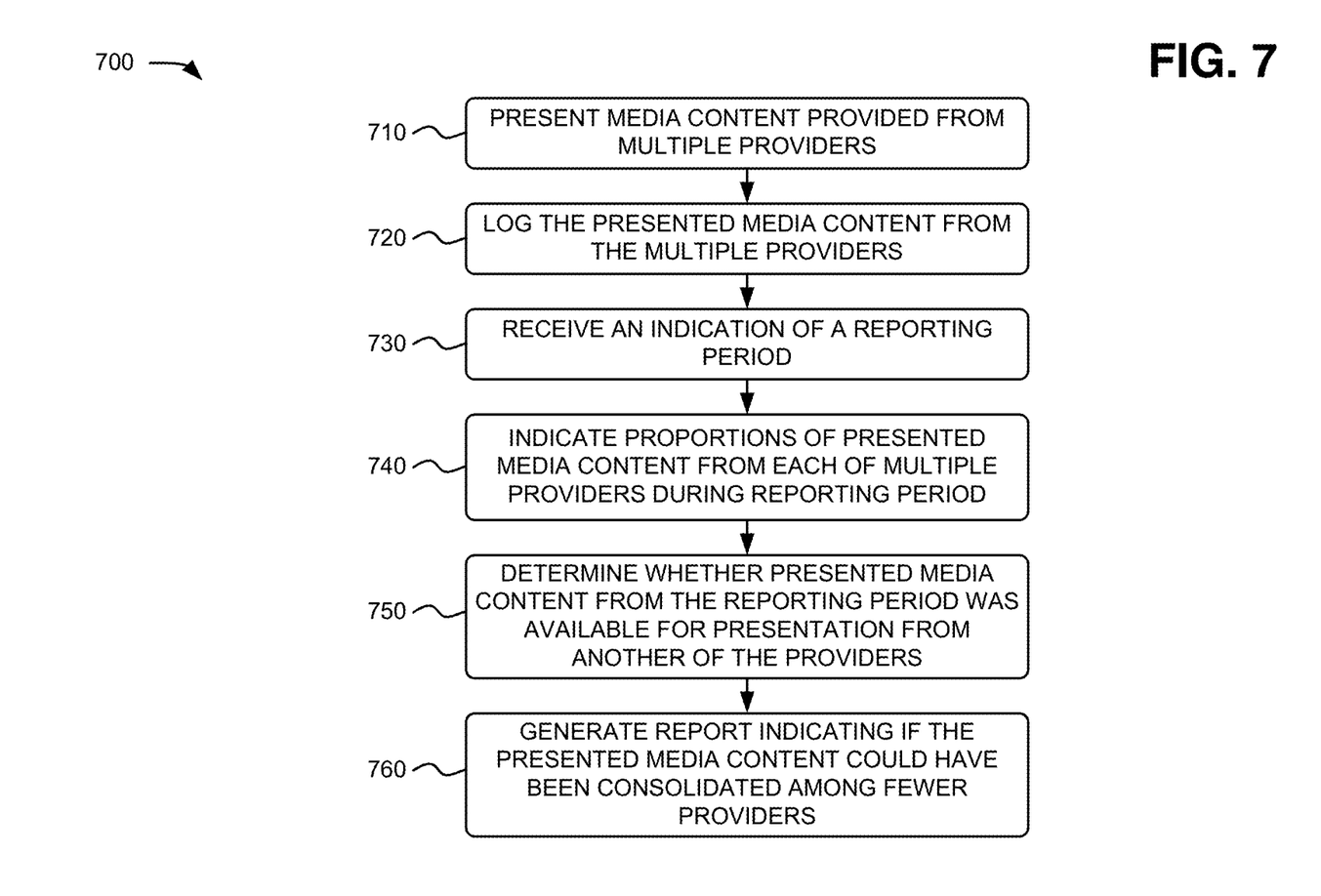
FIG. 7 is a flow diagram of an exemplary process for reporting content consumption in a cross-platform application.

FIG. 7 is a flow diagram of an exemplary process 700 for reporting content consumption in a cross-platform application. In one implementation, process 700 may be performed by user device 260. In another implementation, some or all of process 700 may be performed by another device or group of devices, including or excluding user device 260. For example, a device in service provider network 210 may perform one or more parts of process 700.

As shown in FIG. 7, process 700 may include presenting media content that has been provided by multiple providers (block 710). For example, as described above in connection with FIG. 4, user device 260 may receive requested content 410 from content distribution system 230 and/or partner content providers 250. Requested content 410 may be provided, for example, for presentation to a user in response to content selections provided from the user of a cross-platform application being executed on user device 260.

Process 700 may further include logging the presented media content from the multiple providers (block 720), and receiving an indication of a reporting period (block 730). For example, as described above in connection with FIGS. 4 and 5, user device 260 (e.g., viewing data collector 550) may create a content usage log based on requested content 410. The content usage log may include, for each item of requested content 410, metadata such as a content identifier (e.g., a title, universal ID number, etc.), a viewing time (e.g., a start and stop time), a content source (e.g., content distribution system 230 or a partner content provider 250), a type of content, etc. User device 260 may use the content usage log to generate a report, for a user, that indicates a breakdown of use among multiple sources. The report may be generated, for example, in response to a particular user request or as part of a scheduled report cycle.

Process 700 may also include indicating proportions of presented media content from each of multiple providers during the reporting period (block 740). For example, as described above in connection with FIGS. 4 and 5, user device 260 (e.g., report generator 580) may apply information from viewing data collector 550 and results from content correlation module 570 to generate a usage report. The usage report may be presented, for example, via user interface 540. The usage report may include a graphical representation, tables, and or other information formats.

Process 700 may also include determining whether presented media content from the reporting period was available for presentation from another of the providers (block 750), and generate report indicating if the presented media content could have been consolidated among fewer providers (block 760). For example, as described above in connection with FIGS. 4 and 5, user device 260 (e.g., content correlation module 570) may determine whether content viewed during a particular reporting period could be consumed in a more efficient manner. Content correlation module 570 may detect if all content from a particular provider could have been received from other providers (e.g., with whom a user already has an active account). User device 260 (e.g., report generator 580) may use information from correlation module 570 to provide a use analysis report to the user.

As described above, an application for a user device may present media content provided from multiple content providers and may log instances of the presented media content from the multiple providers. The user device may generate a report, for the user, that indicates proportions of the presented media content from each of the multiple providers during a particular reporting period and if the presented media content could have been consolidated among fewer of the multiple providers.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   presenting, by a user device and to a user, media content provided from multiple providers of over-the-top (OTT) media services under different provider accounts associated with the user;
   logging, by the user device, instances of the media content that was presented by the user device, the logging including associating of one of the different provider accounts with each of the instances of the media content;
   indicating, by the user device, proportions of the media content, from each of the provider accounts, that was presented by the user device during a particular reporting period in the past;
   determining, based on the logging, that particular instances of the media content that were presented to the user by the user device, during the particular reporting period, were available for presentation from other of the multiple providers under another one of the different provider accounts; and
   generating a report, for the user, indicating, based on the determining, the media content that was presented by the user device during the particular reporting period could have been consolidated among fewer of the different provider accounts associated with the user.

2. The method of claim 1, wherein the determining further comprises:
   sending, to a remote data center, a content correlation request that includes content identifiers, instances of the media content, only from providers other than a majority provider of the multiple providers, and
   receiving, from the remote data center, a listing of overlapping media content during the particular reporting period.

3. The method of claim 2, further comprising:
   receiving user input to define the particular reporting period in the past, wherein the sending the content correlation request occurs after receiving the user input.

4. The method of claim 1, wherein the determining further comprises:
   receiving user input to define the particular reporting period in the past,
   receiving, from a remote data center and after receiving the user input, content listings for the multiple providers for the particular reporting period, and
   detecting overlapping media content, for the instances of media content that were presented by the user device, within the particular reporting period.

5. The method of claim 1, wherein the logging includes designating a content identifier, and a time associated with each instance of the media content that was presented by the user device.

6. The method of claim 5, wherein the logging further includes designating a duration associated with each instance of the media content that was presented by the user device.

7. The method of claim 1, further comprising:
   generating another report indicating whether the particular instances of the media content, of the media content from the particular reporting period, was available for presentation from another of the multiple providers,
   removing personal information of the user from the other report, and
   providing the other report, without the personal information of the user, to a network device associated with a service provider.

8. The method of claim 1, further comprising:
   presenting, a user interface to solicit the particular reporting period from the user; and
   receiving, via the user interface, an indication of the particular reporting period.

9. The method of claim 1, further comprising:
   presenting, to the user, a sortable list of items in the media content that was presented by the user device for the particular reporting period.

10. The method of claim 9, wherein each item in the sortable list includes a content identifier field, a date field, and a provider field.

11. The method of claim 1, wherein the multiple providers are selected from a group including:
    subscription-based media providers.

12. The method of claim 1, wherein the indicating includes providing a graphical representation of the proportions of the media content that was presented by the user device by provider.

13. A user device, comprising:
    a network interface to communicate with one or more remote systems;
    one or more memories to store instructions; and
    one or more processors configured to execute instructions in the one or more memories to:
      present media content provided from multiple providers of over-the-top (OTT) media services, wherein the user device accesses the multiple providers through separate accounts for a user,
      log instances of the media content that was presented to the user by the user device, the logging including associating of one of the separate accounts with each of the instances of the media content,
      indicate, to the user, proportions of the media content, from each of the multiple providers, that was presented by the user device during a particular reporting period,
      determining particular instances of the media content that were presented to the user by the user device, during the particular reporting period, were available for presentation from other of the multiple providers under another one of the separate accounts, and
      generating a report, for the user, indicating, based on the determining, the media content that was presented by the user device during the particular reporting period could have been consolidated among fewer of the separate accounts.

14. The user device of claim 13, wherein, when determining particular instances of the media content that were presented to the user by the user device were available for presentation from other of the multiple providers under another one of the separate accounts, the one or more processors are further configured to execute instructions in the one or more memories to:
  send, via the network interface and to a remote data center, a content correlation request, and
  receive, via the network interface and from the remote data center, a listing of overlapping media content during the particular reporting period.

15. The user device of claim 13, wherein, when logging the media content that was presented to the user by the user device, the one or more processors are further configured to:
  log a content identifier, a provider, and a time associated with each item of the media content that was presented by the user device.

16. The user device of claim 13, wherein the one or more processors are further configured to:
  generate another report indicating whether the particular media content, of the media content from the particular reporting period, was available for presentation from another of the multiple providers,
  remove personal information of the user from the other report, and
  provide the other report, without the personal information of the user, to a network device associated with a service provider.

17. The user device of claim 13, wherein the one or more processors are further configured to:
  present, to a user, a user interface to solicit the particular reporting period; and
  receive, via the user interface, an indication of the particular reporting period.

18. The user device of claim 13, wherein the one or more processors are further configured to:
  present, to the user, a sortable list of items in the media content for the particular reporting period.

19. A non-transitory computer-readable medium comprising computer-executable instructions, the computer-readable medium comprising one or more instructions to:
  present, to a user, media content provided from multiple providers of over-the-top (OTT) media services, wherein the multiple providers each have separate accounts for the user;
  log instances of the media content that was presented to the user from the multiple providers, the logging including associating of one of the separate accounts with each of the instances of the media content;
  receive an indication of a particular reporting period;
  indicate, to the user, proportions of the media content, from each of the multiple providers, that was presented to the user during the particular reporting period;
  determine particular instances of the media content that were presented to the user from the particular reporting period, were available for presentation from other of the multiple providers under another one of the separate accounts; and
  generate a report, for the user, indicating the media content that was presented to the user during the particular reporting period could have been consolidated among fewer of the separate accounts.

20. The computer-readable medium of claim 19, further comprising one or more instructions to:
  present, to the user, a sortable list of items in the media content for the particular reporting period.

* * * * *